United States Patent
Kawahara

(10) Patent No.: US 6,802,187 B2
(45) Date of Patent: Oct. 12, 2004

(54) AIR CONDITIONING SYSTEMS FOR VEHICLES, VEHICLES COMPRISING SUCH AIR CONDITIONING SYSTEMS, AND METHODS FOR DRIVING HYBRID COMPRESSORS OF SUCH AIR CONDITIONING SYSTEMS

(75) Inventor: Takayuki Kawahara, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/633,545

(22) Filed: Aug. 5, 2003

(65) Prior Publication Data
US 2004/0055319 A1 Mar. 25, 2004

(30) Foreign Application Priority Data
Sep. 19, 2002 (JP) .................................. P2002/274024
Mar. 28, 2003 (JP) .................................. P2003/090596

(51) Int. Cl.⁷ .............................................. F25B 27/00
(52) U.S. Cl. ..................... 62/228.1; 62/236; 417/374
(58) Field of Search ......................... 417/374; 62/236, 62/228.1, 228.5, 244

(56) References Cited

U.S. PATENT DOCUMENTS

| 4,051,691 A | * | 10/1977 | Dawkins ..................... 62/236 |
| 4,591,318 A | | 5/1986 | Elson |
| 4,990,071 A | | 2/1991 | Sugimoto |
| 5,385,453 A | | 1/1995 | Fogt et al. |
| 5,435,144 A | | 7/1995 | Kalmbach |
| 5,755,564 A | | 5/1998 | Machida et al. |
| 5,867,996 A | | 2/1999 | Takano et al. |
| 5,983,656 A | | 11/1999 | Tokumasu |
| 6,109,045 A | | 8/2000 | Takenaka |
| 6,192,155 B1 | | 2/2001 | Fan |
| 6,217,297 B1 | | 4/2001 | Tsumagari et al. |
| 6,230,507 B1 | | 5/2001 | Ban et al. |
| 6,234,769 B1 | | 5/2001 | Sakai et al. |
| 6,247,899 B1 | | 6/2001 | Ban et al. |
| 6,287,081 B1 | | 9/2001 | Tamegai et al. |
| ,047,659 A1 | | 12/2001 | Nakamura et al. |
| ,049,943 A1 | | 12/2001 | Nakamura et al. |
| 6,334,755 B1 | | 1/2002 | Coudray et al. |
| 6,367,270 B2 | * | 4/2002 | Niimi et al. .................. 62/133 |
| 6,375,436 B1 | | 4/2002 | Irie et al. |
| 6,443,712 B2 | | 9/2002 | Sakai et al. |
| 6,543,243 B2 | | 4/2003 | Mohrmann et al. |

(List continued on next page.)

FOREIGN PATENT DOCUMENTS

| DE | 19513710 | 10/1995 |
| EP | 1213166 | 6/2002 |
| JP | 687678 | 12/1984 |
| JP | 60153885 | 10/1985 |
| JP | 2001310624 | 11/2001 |

Primary Examiner—William E. Tapolcai
(74) Attorney, Agent, or Firm—Baker Botts L.L.P.

(57) ABSTRACT

A method for driving a hybrid compressor of an air conditioning system of a vehicle is provided. The vehicle includes a first drive source, and the air conditioning system includes an evaporator. Moreover, the hybrid compressor includes a second drive source, and the hybrid compressor is driven by the first drive source via an electromagnetic clutch or the second drive source, or combination thereof. The method includes the steps of engaging the electromagnetic clutch, detecting a temperature of air dispensed from the evaporator, and disengaging the electromagnetic clutch when the temperature of the air is equal to a predetermined temperature. The method also includes the step of activating the second drive source. Specifically the step of disengaging the electromagnetic clutch when the temperature of the air is equal to the predetermined temperature and the step of activating the second drive source is performed simultaneously or substantially simultaneously.

60 Claims, 1 Drawing Sheet

U.S. PATENT DOCUMENTS

| | | | | |
|---|---|---|---|---|
| 6,688,122 B2 | * | 2/2004 | Matsuoka | 62/134 |
| 6,715,995 B2 | * | 4/2004 | Kelm et al. | 417/12 |
| 6,748,750 B2 | * | 6/2004 | Choi | 62/115 |
| 2002/0157413 A1 | * | 10/2002 | Iwanami et al. | 62/236 |
| 2003/0053916 A1 | | 3/2003 | Terauchi | |
| 2003/0079484 A1 | * | 5/2003 | Matsuoka | 62/180 |
| 2003/0136138 A1 | | 7/2003 | Tsuboi et al. | |
| 2003/0152467 A1 | | 8/2003 | Higashiyama et al. | |
| 2004/0000156 A1 | | 1/2004 | Inoue et al. | |
| 2004/0001760 A1 | | 1/2004 | Yoshii et al. | |

* cited by examiner

AIR CONDITIONING SYSTEMS FOR VEHICLES, VEHICLES COMPRISING SUCH AIR CONDITIONING SYSTEMS, AND METHODS FOR DRIVING HYBRID COMPRESSORS OF SUCH AIR CONDITIONING SYSTEMS

BACKGROUND OF THE INVENTION

1. Field of the Invention

The present invention relates generally to air conditioning systems for use in a vehicles, vehicles comprising such air conditioning systems, and methods for driving a hybrid compressor of the air conditioning system. In particular, the present invention is directed towards vehicles, air conditioning systems, and methods for driving hybrid compressors, in which fluctuations in a driving torque of the vehicle is reduced.

2. Description of Related Art

Known hybrid vehicles include an engine, and an air conditioning system. The air conditioning system includes a hybrid compressor, and the hybrid compressor includes an electric motor. The hybrid compressor may be driven by the engine or the electric motor, or both.

A Known hybrid, variable displacement-type compressor, such as the hybrid, variable displacement-type compressor described in U.S. Pat. No. 6,247,899 B1, includes a drive shaft, a compression mechanism, and an electromagnetic clutch. The compression mechanism includes a swash plate. The electromagnetic clutch is coupled operationally to the engine, and the drive shaft is coupled operationally to the electromagnetic clutch and the electric motor. The drive shaft also is coupled operationally to the compression mechanism. Moreover, a driving force is selectively transmitted from the engine to the drive shaft via the electromagnetic clutch, and from the electric motor to the drive shaft.

A known hybrid, rotary-type compressor, such as the hybrid, rotary-type compressor described in U.S. Pat. No. 6,375,436 B1, includes a drive shaft a compression mechanism, and an electromagnetic clutch. The electromagnetic clutch is coupled operationally to the engine, and the drive shaft is coupled operationally to the electromagnetic clutch and the electric motor. The drive shaft also is coupled operationally to the compression mechanism. Moreover, a driving force is selectively transmitted from the engine to the drive shaft via the electromagnetic clutch, and from the electric motor to the drive shaft.

Other known hybrid compressors, such as the hybrid compressors described in Japanese Patent Application Nos. 2001-280630 and 2002-031644, include a first drive shaft, a second drive shaft, a first compression mechanism, a second compression mechanism, and an electromagnetic clutch. The electromagnetic clutch is coupled operationally to the engine, and the first drive shaft is coupled operationally to the electromagnetic clutch. The first drive shaft also is coupled operationally to the first compression mechanism. Similarly, the second drive shaft is coupled operationally to the electric motor and the second compression mechanism. Moreover, a driving force is transmitted from the engine to the first drive shaft via the electromagnetic clutch, or from the electric motor to the second drive shaft, or both. As such, the first drive shaft and the second drive shaft may be driven selectively, i.e., by the engine or the electric motor but not both, or simultaneously, i.e. by both the engine and the electric motor.

In air conditioning systems including such known hybrid compressors, when operation of the air conditioning system begins, a temperature of air dispensed from an evaporator of the compressor is greater than a first temperature. Subsequently, when the temperature of the air dispensed from the evaporator decreases to the first temperature he electromagnetic clutch is disengaged, such that the engine and the compressor transitions from active to inactive to prevent the evaporator from freezing. When the engine is active, the driving force of the engine is transmitted to the drive shaft to drive the compressor, and when the engine is inactive, the driving force of the engine is not transmitted to the drive shaft. Similarly, when the compressor is active, the compressor is driven to compress a refrigerant, and when the compressor is inactive, the compressor does not compress the refrigerant. Subsequently, when the temperature of the air dispensed from the evaporator increases from the first temperature to a second temperature, the electromagnetic clutch is engaged, such that the driving force from the engine is transmitted to the drive shaft, and the compressor transitions from inactive to active. When the compressor transitions from inactive to active, a load demanded by the compressor increases, which causes a driving torque of the vehicle to increase. Moreover, when the compressor frequently transitions from active to inactive and then from inactive to active, the driving torque fluctuates, which decreases the vehicle's efficiency.

SUMMARY OF THE INVENTION

Therefore, a need has arisen for hybrid compressors which overcome these and other shortcomings of the related art A technical advantage of the present invention is that the driving torque of the vehicle fluctuates less frequently than in the known compressors.

According to an embodiment of the present invention, an air conditioning system for a vehicle comprises a hybrid compressor and an evaporator, and the vehicle comprises a first drive source. The hybrid compressor comprises a second drive source and a temperature sensor for detecting the temperature of air dispensed from the evaporator. The hybrid compressor is driven by the first drive source via an electromagnetic clutch or the second drive source, or a combination thereof. The electromagnetic clutch is disengaged and the second drive source is active when a temperature of the air dispensed from the evaporator is equal to a first predetermined temperature.

According to another embodiment of the present invention, a vehicle comprises a fist drive source and an air conditioning system. The air conditioning system comprises a hybrid compressor and an evaporator. The hybrid compressor comprises a second drive source and a temperature sensor for detecting the temperature of air dispensed from the evaporator. The hybrid compressor is driven by the first drive source via an electromagnetic clutch or the second drive source, or a combination thereof. The electromagnetic clutch is disengaged and the second drive source is active when a temperature of air dispensed from the evaporator is equal to a first predetermined temperature.

According to yet another embodiment of the present invention, a method for driving a hybrid compressor of an air conditioning system of a vehicle is provided. The vehicle comprises a first drive source, and the air conditioning system comprises an evaporator. Moreover, the hybrid compressor comprises a second drive source, and the hybrid compressor is driven by the first drive source via an electromagnetic clutch or the second drive source, or combination thereof. The method comprises the steps of engaging the electromagnetic clutch, detecting a temperature of air dispensed from the evaporator, and disengaging the electromagnetic clutch when the temperature of the air is equal to a predetermined temperature. The method also comprises the step of activating the second drive source. Specifically, the step of disengaging the electromagnetic clutch when the temperature of the air is equal to the first predetermined temperature, and the step of activating the second drive source, are performed simultaneously or substantially simultaneously.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawing.

DETAILED DESCRIPTION OF PREFERRED EMBODIMENTS

Figure 1:
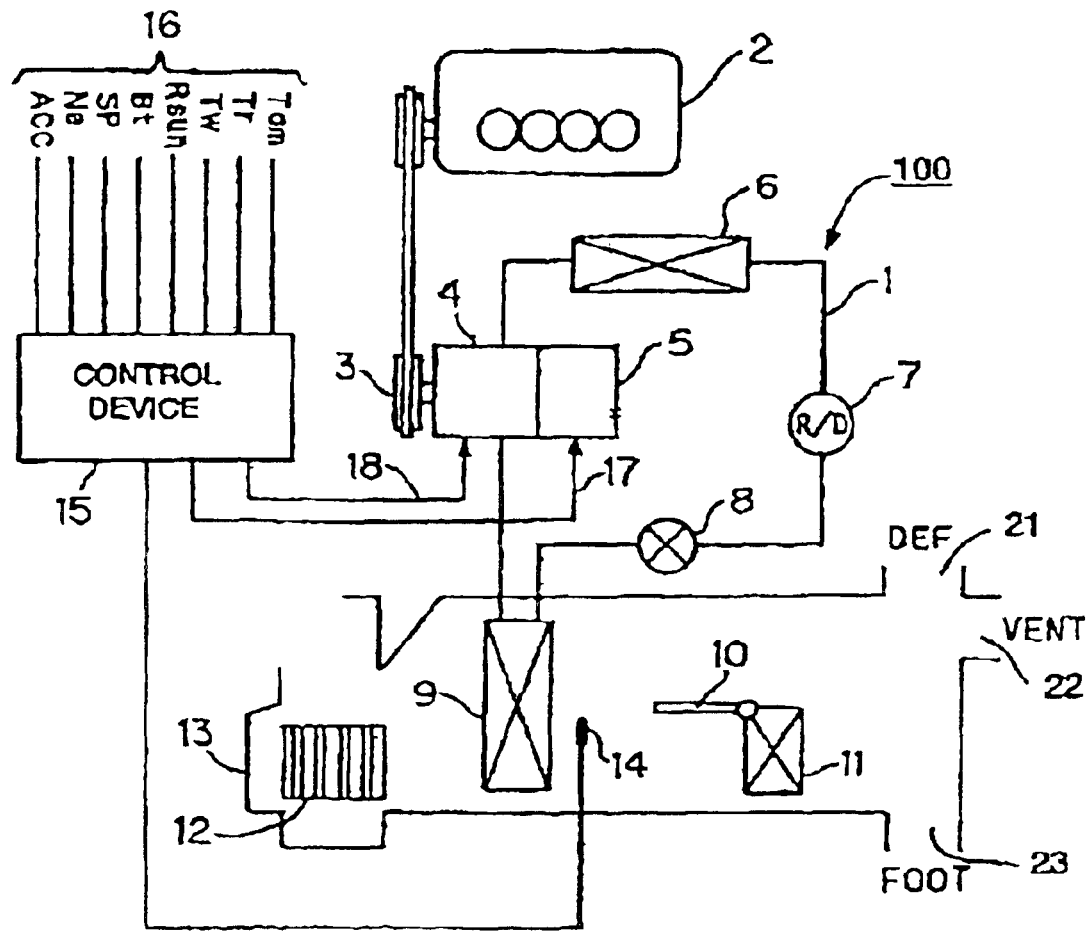
FIG. 1 is a schematic diagram of an air conditioning system for a vehicle, according to an embodiment of the present invention.

Preferred embodiments of the present invention and their features and advantages may be understood by referring to FIG. 1.

Referring to FIG. 1, an air conditioning system 100 for a vehicle (not shown) according to an embodiment of the present invention is depicted. Air conditioning system 100 may comprise a hybrid compressor 4 and a refrigeration system 1. Hybrid compressor 4 may be a variable displacement-type compressor, a swash plate-type compressor, a rotary-type compressor, a scroll-type compressor, or the like. In an embodiment, the vehicle may comprise a first drive source 2, e.g., an engine, and hybrid compressor 4 may comprise a second drive source 5, e.g. an electric motor. In this embodiment, hybrid compressor 4 may be driven by first drive source 2, second drive source 5, or both. The driving force of first drive source 2 may be transmitted to hybrid compressor 4 via an electromagnetic clutch 3 attached to hybrid compressor 4.

In another embodiment, hybrid compressor 4 may be similar to a hybrid compressor described in U.S. Pat. No. 6,247,899 B1 or U.S. Pat. No. 6,375,436 B1, the disclosures of which are incorporated herein by reference. For example, hybrid compressor 4 may comprise a first compression mechanism (not shown) and a second compression mechanism (not shown). Specifically, first drive source 2 may drive the first compression mechanism, and second drive source 5 may drive the second compression mechanism. Moreover, air conditioning system 100 may comprise means for selecting whether first drive source 2 or second drive source 5, or both, drives compressor 4. For example, the means for selecting may comprise a control device 15, and first drive source 2 and second drive source 5 may operate selectively or simultaneously in response to electrical, mechanical, or electromechanical signals from control device 15. The vehicle also may comprise an electromagnetic clutch 3 for transmitting a rotational force from firs drive source 2 to a drive shaft (not shown) of compressor 4. In this embodiment, the drive shaft may comprise a first portion and a second portion. Specifically, first drive source 2 may drive the first portion of the drive shaft via electromagnetic clutch 3, and second drive source 5 may drive the second portion of the drive shaft in response to the control signals from control device 15.

In still another embodiment, hybrid compressor 4 may be similar to a hybrid compressor described in Japanese Patent Application No. 2001-280630 or Japanese Patent Application No. 2002-031664. For example, hybrid compressor 4 may comprise a first drive shaft and a second drive shaft. Moreover, first drive source 2 may drive the first drive shaft via electromagnetic clutch 3, and second drive source 5 may drive the second drive shaft via control device 15. In another example, air conditioning system 100 may comprise a pair of hybrid compressors 4. Specifically, a first hybrid compressor of the pair of hybrid compressors 4 may comprise the first drive shaft, and a second hybrid compressor of the pair of hybrid compressors 4 may comprise the second drive shaft. Moreover, first drive source 2 may drive the first drive shaft via electromagnetic clutch 3, and second drive source 5 may drive the second drive shaft via control device 15.

In any of the above-described embodiments of the present invention, refrigeration system 1 may comprise a plurality of refrigeration tubes, and a refrigerant may be circulated within refrigerant system 1 via the refrigeration tubes. Refrigeration system 1 may comprise compressor 4, a condenser 6; a receiver 7; an expansion valve 8; and an evaporator 9. Compressor 4 may be coupled to condenser 6, and condenser 6 may be coupled to receiver 7. Receiver 7 may be coupled to expansion valve 8, and expansion valve 8 may be coupled to evaporator 9. Moreover, evaporator 9 may be coupled to compressor 4, such that compressor 4, condenser 6, receiver 7, expansion valve 8, and evaporator 9 form a closed, refrigeration circuit. In operation, compressor 4 may receive refrigerant gas from evaporator 9 and also may compress that refrigerant gas. Compressing the refrigerant gas may increase a temperature and a pressure of the refrigerant gas. Compressor 4 may pass the compressed refrigerant gas to condenser 6. When the compressed refrigerant gas flows through condenser 6, at least a portion of the refrigerant gas may condense into a liquid refrigerant. Moreover, condenser 6 may pass the condensed refrigerant to receiver 7, and receiver 7 may divide the condensed refrigerant into a liquid refrigerant portion and a refrigerant gas portion Receiver 7 may pass the liquid refrigerant portion of the refrigerant to expansion valve 8, which may decrease the pressure of the liquid refrigerant When expansion valve 8 reduces the pressure of the liquid refrigerant, expansion valve 8 may pass the refrigerant to evaporator 9, and heat exchange the refrigerant with air dispensed by a blower 12, which may evaporate the liquid refrigerant into the refrigerant gas. The refrigerant gas then may be passed to compressor 4.

Air conditioning system 100 also may comprise a heater core 11 positioned at a downstream side of evaporator 9, and an air mix damper 10 formed between the downstream side of evaporator 9 and an upstream side of heater core 11. Air mix damper 10 may be driven by a servo-motor (not shown). The movement of air mix damper 10 may control a volume of air passing through heater core 11 via evaporator 9, which may control the air temperature within the interior of the vehicle. Moreover, blower 12, evaporator 9, air mix damper 10, and heater core 11 may be positioned within an air duct 13. Air conditioning system 100 also may comprise a first discharge port 21, a second discharge port 22, and a third discharge port 23. Discharge ports 21-23 may be positioned at a downstream side of air duct 13. For example, first discharge port 21 may be formed above third discharge port 23, and second discharge port 22 may be formed between first discharge port 21 and third discharge port 23. Moreover, first discharge port 21 may be used during a DEFROST mode, second discharge port 22 may be used during a VENT mode, and third discharge port 23 may be used during a FOOT mode. Such modes may determine the source from which the air entering the interior of the vehicle is drawn, or the direction in which the entering air blows, or both.

A temperature sensor 14 for measuring a temperature Te of an air dispensed from evaporator 9 may be positioned between evaporator 9 and heater core 11. Temperature sensor 14 also may be connected operationally to control device 15, and temperature sensor 14 transmits a signal indicating a value of temperature Te to control device 15. In an embodiment of the present invention, the vehicle also may comprise an electric power supply (not shown), e.g., a battery, for second drive source 5. Control device 15 also may receive a plurality of signals 16, such as a plurality of signals indicating an outside air temperature Tam, a vehicle interior temperature Tr, a heater water temperature Tw, an amount of ambient light Tsun, a voltage Bt of the electric power supply, a vehicle speed Sp, an engine rotational speed Ne, and an accelerator opening degree Acc, or the like. Based on signals 16 and temperature Te of air dispensed from evaporator 9, control device 15 may generate a first control signal 17 for controlling a rotational speed of second drive source 5, and a second control signal 18 for controlling the engagement and disengagement of electromagnetic clutch 3.

Specifically, when second drive source 5 drives compressor 4, electromagnetic clutch 3 may be disengaged, and first control signal 17 may be transmitted to second drive source 5 to control the rotational speed of second drive source 5. Nevertheless, when first drive source 2 drives compressor 4, first control signal 17 may be deactivated, and electromagnetic clutch 3 may be engaged. In another embodiment of the present invention, first drive source 2 and second drive source 5 may operate simultaneously, Moreover, based on temperature Te of the air dispensed from evaporator 9, control device 15 may select the rotational speed of second drive source 5, or determine whether to engage or disengage electromagnetic clutch 3, or both.

In any of the above-described embodiments of the present invention, when first drive source 2 drives compressor 4, and control device 5 detects that air temperature Te equals a first predetermined tempers electromagnetic clutch 3 transitions from engaged to disengaged, and second drive source 5 transitions from inactive to active. For example, the first predetermined temperature may be between about 0° C. and about 3° C. When second drive source 5 is active, second drive source 5 drives compressor 4, and when second drive source 5 is inactive, second drive source 5 does not drive compressor 4. Specifically, when operation of air conditioning system 100 begins, air temperature Te may be greater than the first predetermined temperature. Moreover, during the operation of air conditioning system 100, air temperature Te may decease to the first predetermined temperature, which causes electromagnetic clutch 3 to transition from engaged to disengaged and second drive source 5 to transition from inactive to active. The transition of electromagnetic clutch 3 from engaged to disengaged, and the transition of second drive source 5 from inactive to active, may occur simultaneously or substantially simultaneously. Moreover, the driving torque of the vehicle may be unchanged or substantially unchanged by the transition from first drive source 2 driving compressor 4 to second drive source 5 diving compressor 4. Specifically, in any of the above described embodiments of compressor 4, when second drive source 5 drives compressor 4, a rotational speed of second drive source 5 may be controlled, such that a discharge capacity of compressor 4 is less than when first drive source 2 drives compressor 4.

After electromagnetic clutch 3 transitions from engaged to disengaged, and second drive source 5 transitions film inactive to active, air temperature Te increases ten the first predetermined temperature to a second predetermined temperature. For example, the second predetermined temperature may be between about 4° C. and about 6° C. When air temperature Te is about equal to the second predetermined temperature, second drive source 5 transitions from active to inactive, and electromagnetic clutch 3 transitions from disengaged to engaged. Nevertheless, the rate at which air temperature Te increases from the first predetermined temperature to the second predetermined temperature when second drive source 5 drives compressor 4 is less than the rate at which air temperature Te increases from the first predetermined temperature to the second predetermined temperature when compressor 4 transitions from active to inactive after air temperature Te decreases and becomes about equal to the first predetermined temperature. Thus, the amount of time between disengaging and engaging electromagnetic clutch 3 increases relative to the known hybrid compressors. Moreover, compressor 4 may not transition from active to inactive when air temperature Te decreases to the first predetermined temperature during the operation of air conditioning system 100. Consequently, the driving torque of the vehicle may not fluctuate.

While the invention has been described in connection with preferred embodiments, it will be understood by those skilled in the art that variations and modifications of the preferred embodiments described above may be made without departing from the scope and spirit of this invention. Other embodiments will be apparent to those skilled in the art from a consideration of the specification or from a practice of the invention disclosed herein. It is intended that the specification and the described examples are considered exemplary only, with the true scope of the invention indicated by the following claims.

What is claimed is:

1. A method for driving a hybrid compressor of an air conditioning system of a vehicle, wherein the vehicle comprises a first drive source, the air conditioning system comprises an evaporator, the hybrid compressor comprises a second drive source, and the hybrid compressor is driven by the first drive source via an electromagnetic clutch or the second drive source, or combination thereof, wherein the method comprises the steps of:
   (a) engaging the electromagnetic clutch;
   (b) detecting a temperature of air dispensed from the evaporator;
   (c) disengaging the electromagnetic clutch when the temperature of the air is equal to a first predetermined temperature; and
   (d) activating the second drive source, wherein steps (c) and (d) are performed simultaneously or substantially simultaneously.

2. The method of claim 1, further comprising the step of:
   (e) engaging the electromagnetic clutch when the temperature of the air increases from the first predetermined temperature to a second predetermined temperature, wherein step (e) is performed after steps (c) and (d).

3. The method of claim 1, wherein the first drive source comprises an engine of the vehicle, and the second drive source comprises an electric motor.

4. An air conditioning system for a vehicle, wherein the vehicle comprises a first drive source, the air conditioning system comprises a hybrid compressor and an evaporator, and the hybrid compressor comprises a second drive source and a temperature sensor for detecting the temperature of air dispensed from the evaporator, wherein the hybrid compressor is driven by the first drive source via an electromagnetic clutch or the second drive source, or a combination thereof, and the electromagnetic clutch is disengaged and the second drive source is active when a temperature of the air dispensed from the evaporator is equal to a first predetermined temperature.

5. The air conditioning system of claim 4, wherein the electromagnetic clutch is engaged when the temperature of the air is equal to a second predetermined temperature, and the second predetermined temperature is greater than the first predetermined temperature.

6. The air conditioning system of claim 4, wherein the first drive source comprises an engine of the vehicle, and the second drive source comprises an electric motor.

7. The air conditioning system of claim 4, wherein the hybrid compressor further comprises a drive shaft driven by the first drive source or the second drive source, or a combination thereof.

8. The air conditioning system of claim 4, wherein the hybrid compressor further comprises:
a first compression mechanism comprising a first drive shaft driven by the first drive source; and
a second compression mechanism comprising a second drive shaft driven by the second drive source, wherein the first drive shaft and the second drive shaft are driven selectively or simultaneously.

9. The air conditioning system of claim 4, wherein the hybrid compressor further comprises:
a first compressor comprising a first drive shaft driven by the first drive source; and
a second compressor comprising a second drive shaft driven by the second drive source, wherein the first compressor and the second compressor are driven selectively or simultaneously.

10. A vehicle comprising:
a first drive source; and
an air conditioning system comprising a hybrid compressor and an evaporator, wherein the hybrid compressor comprises a second drive source and a temperature sensor for detecting the temperature of air dispensed from the evaporator, wherein the hybrid compressor is driven by the first drive source via an electromagnetic clutch or the second drive source, or a combination thereof, and the electromagnetic clutch is disengaged and the second drive source is active when a temperature of the air dispensed from the evaporator is equal to a first predetermined temperature.

11. The vehicle of claim 10, wherein the electromagnetic clutch is engaged when the temperature of the air is equal to a second predetermined temperature, and the second predetermined temperature is greater than the first predetermined temperature.

12. The vehicle of claim 10, wherein the first drive source comprises an engine of the vehicle, and the second drive source comprises an electric motor.

13. The vehicle of claim 10, wherein the hybrid compressor further comprises a drive shaft driven by the first drive source or the second drive source, or a combination thereof.

14. The vehicle of claim 10, wherein the hybrid compressor further comprises:
a first compression mechanism comprising a first drive shaft driven by the first drive source; and
a second compression mechanism comprising a second drive shaft driven by the second drive source, wherein the first drive shaft and the second drive shaft are driven selectively or simultaneously.

15. The vehicle of claim 10, wherein the hybrid compressor further comprises:
a first compressor comprising a first drive shaft driven by the first drive source; and
a second compressor comprising a second drive shaft driven by the second drive source, wherein the first compressor and the second compressor are driven selectively or simultaneously.

16. The method of claim 1, further comprising the step of controlling a rotational speed of the second drive source based on at least one measurement.

17. The method of claim 16, wherein the at least one measurement comprises at least one temperature parameter.

18. The method of claim 16, wherein the at least one measurement comprises at least one vehicle parameter.

19. The method of claim 16, wherein the at least one measurement comprises at least one temperature parameter and at least one vehicle parameter.

20. The method of claim 17, wherein the at least one temperature parameter is selected from the group consisting of the temperature of the air dispensed from the evaporator, an outside air temperature, a vehicle interior temperature, a heater water temperature, and an amount of ambient light.

21. The method of claim 18, wherein the at least one vehicle parameter is selected from the group consisting of a voltage of an electrical power supply of the second drive source, a vehicle speed, a rotational speed of the first drive source, and an accelerator opening degree.

22. The method of claim 19, wherein the at least one temperature parameter is selected from the group consisting of the temperature of the air dispensed from the evaporator, an outside air temperature, a vehicle interior temperature, a heater water temperature, and an amount of ambient light.

23. The method of claim 22, wherein the at least one vehicle parameter is selected from the group consisting of a voltage of an electrical power supply of the second drive source, a vehicle speed, a rotational speed of the first drive source, and an accelerator opening degree.

24. The method of claim 19, wherein the at least one vehicle parameter is selected from the group consisting of a voltage of an electrical power supply of the second drive source, a vehicle speed, a rotational speed of the first drive source, and an accelerator opening degree.

25. The air conditioning system of claim 4, further comprising means for controlling a rotational speed of the second drive source based on at least one measurement.

26. The air conditioning system of claim 25, wherein the at least one measurement comprises at least one temperature parameter.

27. The air conditioning system of claim 25, wherein the at least one measurement comprises at least one vehicle parameter.

28. The air conditioning system of claim 25, wherein the at least one measurement comprises at least one temperature parameter and at least one vehicle parameter.

29. The air conditioning system of claim 26, wherein the at least one temperature parameter is selected from the group consisting of the temperature of the air dispensed from the evaporator, an outside air temperature, a vehicle interior temperature, a heater water temperature, and an amount of ambient light.

30. The air conditioning system of claim 27, wherein the at least one vehicle parameter is selected from the group consisting of a voltage of an electrical power supply of the second drive source, a vehicle speed, a rotational speed of the first drive source, and an accelerator opening degree.

31. The air conditioning system of claim 28, wherein the at least one temperature parameter is selected from the group consisting of the temperature of the air dispensed from the evaporator, an outside air temperature, a vehicle interior temperature, a heater water temperature, and an amount of ambient light.

32. The air conditioning system of claim 31, wherein the at least one vehicle parameter is selected from the group consisting of a voltage of an electrical power supply of the second drive source, a vehicle speed, a rotational speed of the first drive source, and an accelerator opening degree.

33. The air conditioning system of claim 28, wherein the at least one vehicle parameter is selected from the group consisting of a voltage of an electrical power supply of the second drive source, a vehicle speed, a rotational speed of the first drive source, and an accelerator opening degree.

34. The air conditioning system of claim 4, further comprising means for controlling the electromagnetic clutch based on the temperature of the air dispensed from the evaporator and at least one additional measurement.

35. The air conditioning system of claim 34, wherein the at least one additional measurement comprises at least one temperature parameter.

36. The air conditioning system of claim 34, wherein the at least one additional measurement comprises at least one vehicle parameter.

37. The air conditioning system of claim 34, wherein the at least one additional measurement comprises at least one temperature parameter and at least one vehicle parameter.

38. The air conditioning system of claim 35, wherein the at least one temperature parameter is selected from the group consisting of an outside air temperature, a vehicle interior temperature, a heater water temperature, and an amount of ambient light.

39. The air conditioning system of claim 36, wherein the at least one vehicle parameter is selected from the group consisting of a voltage of an electrical power supply of the second drive source, a vehicle speed, a rotational speed of the first drive source, and an accelerator opening degree.

40. The air conditioning system of claim 37, wherein the at least one temperature parameter is selected from the group consisting of an outside air temperature, a vehicle interior temperature, a heater water temperature, and an amount of ambient light.

41. The air conditioning system of claim 40, wherein the at least one vehicle parameter is selected from the group consisting of a voltage of an electrical power supply of the second drive source, a vehicle speed, a rotational speed of the first drive source, and an accelerator opening degree.

42. The air conditioning system of claim 37, wherein the at least one vehicle parameter is selected from the group consisting of a voltage of an electrical power supply of the second drive source, a vehicle speed, a rotational speed of the first drive source, and an accelerator opening degree.

43. The vehicle of claim 10, wherein the air conditioning system further comprises means for controlling a rotational speed of the second drive source based on at least one measurement.

44. The vehicle of claim 43, wherein the at least one measurement comprises at least one temperature parameter.

45. The vehicle of claim 43, wherein the at least one measurement comprises at least one vehicle parameter.

46. The vehicle of claim 43, wherein the at least one measurement comprises at least one temperature parameter and at least one vehicle parameter.

47. The vehicle of claim 44, wherein the at least one temperature parameter is selected from the group consisting of the temperature of the air dispensed from the evaporator, an outside air temperature, a vehicle interior temperature, a heater water temperature, and an amount of ambient light.

48. The vehicle of claim 45, wherein the at least one vehicle parameter is selected from the group consisting of a voltage of an electrical power supply of the second drive source, a vehicle speed, a rotational speed of the first drive source, and an accelerator opening degree.

49. The vehicle of claim 46, wherein the at least one temperature parameter is selected from the group consisting of the temperature of the air dispensed from the evaporator, an outside air temperature, a vehicle interior temperature, a heater water temperature, and an amount of ambient light.

50. The vehicle of claim 49, wherein the at least one vehicle parameter is selected from the group consisting of a voltage of an electrical power supply of the second drive source, a vehicle speed, a rotational speed of the first drive source, and an accelerator opening degree.

51. The vehicle of claim 46, wherein the at least one vehicle parameter is selected from the group consisting of a voltage of an electrical power supply of the second drive source, a vehicle speed, a rotational speed of the first drive source, and an accelerator opening degree.

52. The vehicle of claim 10, wherein the air conditioning system further comprises means for controlling the electromagnetic clutch based on the temperature of the air dispensed from the evaporator and at least one additional measurement.

53. The vehicle of claim 52, wherein the at least one additional measurement comprises at least one temperature parameter.

54. The vehicle of claim 52, wherein the at least one additional measurement comprises at least one vehicle parameter.

55. The vehicle of claim 52, wherein the at least one additional measurement comprises at least one temperature parameter and at least one vehicle parameter.

56. The vehicle of claim 53, wherein the at least one temperature parameter is selected from the group consisting of an outside air temperature, a vehicle interior temperature, a heater water temperature, and an amount of ambient light.

57. The vehicle of claim 54, wherein the at least one vehicle parameter is selected from the group consisting of a voltage of an electrical power supply of the second drive source, a vehicle speed, a rotational speed of the first drive source, and an accelerator opening degree.

58. The vehicle of claim 55, wherein the at least one temperature parameter is selected from the group consisting of an outside air temperature, a vehicle interior temperature, a heater water temperature, and an amount of ambient light.

59. The vehicle of claim 58, wherein the at least one vehicle parameter is selected from the group consisting of a voltage of an electrical power supply of the second drive source, a vehicle speed, a rotational speed of the first drive source, and an accelerator opening degree.

60. The vehicle of claim 55, wherein the at least one vehicle parameter is selected from the group consisting of a voltage of an electrical power supply of the second drive source, a vehicle speed, a rotational speed of the first drive source, and an accelerator opening degree.

* * * * *